Patented Mar. 21, 1950

2,501,131

UNITED STATES PATENT OFFICE 2,501,131

NITRO-THIOPHANTHRAQUINONES

Henry R. Lee and Viktor Weinmayr, Pitman, N. J., assignors to E. I. du Pont de Nemours & Company, Wilmington, Del., a corporation of Delaware No Drawing. Application January 22, 1947, Serial No. 723,671

4 Claims. (Cl. 260—329)

This invention relates to new thiophanthraquinones, and more particularly to the preparation of nitro-substituted thiophanthraquinones of the formula:

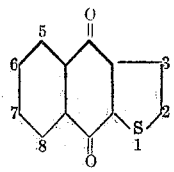

wherein any one of the positions 5, 6, 7 and 8 carry a nitro group, while the remaining positions are unsubstituted.

The term "thiophanthraquinone" is employed in the naming of this compound in view of the original name used by Scholl and Seer in Ann. 394, 131 (1912), who designated the corresponding unsubstituted hydrocarbon compound "thiophanthracene."

It is an object of this invention to prepare new nitrothiophanthraquinones which are useful as starting materials for the preparation of other compounds, and particularly as intermediates for the synthesis of dyes. A further object of the invention is to provide a commercially feasible process for the preparation of these new nitrothiophanthraquinones.

The nitro-thiophanthraquinones of this invention may be made by ring-closing the nitro-(2-thenoyl)-o-benzoic acids disclosed in co-pending application Serial No. 723,670, which, in turn, may be prepared by reacting the nitro-substituted phthalic anhydrides with the Grignard reagent prepared from 2-bromothiophene or 2-iodothiophene, or by condensation of the corresponding nitro-phthalic anhydride with thiophene by the aid of aluminum chloride or similar condensing agent. These nitro-thiophanthraquinones may be reduced to the aminothiophanthraquinones for use in the manufacture of dyestuffs, as more particularly disclosed in co-pending application Serial No. 723,672.

The following examples are given to illustrate the invention. The parts used are by weight.

Example 1

Two (2) parts of 6-nitro-(2-thenoyl)-o-benzoic acid, with a melting range of 216°–217° C., of the formula:

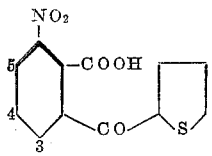

were dissolved in 36 parts of 95% sulfuric acid and the solution was heated at 145° to 150° C. for 2 minutes. The deep red solution was then cooled to below 100° C., and water was added below that temperature to dilute the mass to an acidity of about 25%. The 8-nitro-thiophanthraquinone, precipitated in a crystalline form, was filtered off, washed acid free, and slurried in a dilute solution of sodium carbonate to remove unring-closed 6-nitro-(2-thenoyl)-o-benzoic acid. After again filtering, washing free of alkali and drying, 0.6 part of 8-nitro-thiophanthraquinone was obtained melting at 230°–231° C. It was crystallized several times from 20 parts of chlorobenzene per part of crude product and had a final melting range from 234°–235° C.

Example 2

Two (2) parts of 3-nitro-(2-thenoyl)-o-benzoic acid, melting range 169°–170° C., were dissolved in 36 parts of 95% sulfuric acid and the solution was heated to 148° to 152° C. for several minutes. The reaction mass was worked up as described for the nitro-thiophanthraquinone in Example 1. 0.65 part of 8-nitro-thiophanthraquinone was obtained, melting at from 230°–231° C. It was crystallized several times from 37 parts of chlorobenzene per part of crude product, and melted finally at from 235°–236° C.

Example 3

Twenty-eight (28) parts of anhydrous aluminum chloride were dissolved in 150 parts of nitrobenzene. Ten (10) parts of 5-nitro-(2-thenoyl)-o-benzoic acid, melting range 149°–150° C., were added, and the reaction mass was heated to from 125° to 130° C. for 24 hours. It was then poured into dilute hydrochloric acid and the nitrobenzene was removed with steam. The residue was filtered, washed, dried, and extracted with toluene in a Soxhlet apparatus. The extract was evaporated to dryness, and the 9.3 parts obtained were dissolved in 850 parts of chlorobenzene at about 25° C. The clear solution was passed through a column packed with alumina which had been activated by heating at 325° to 350° C. Most of the impurities were retained on the alumina while the solution of the partially purified 6-nitro-thiophanthraquinone passed slowly through the column. Upon evaporation of this filtrate, 4.4 parts of crude 6-nitro-thiophanthraquinone were obtained, melting from 228° to 230° C. It was crystallized several times from 16 parts of chlorobenzene per part of crude product, and 6-nitro-thiophanthraquinone, melting from 233°–234° C., was obtained.

A mixed melting point of this nitro-thiophanthraquinone, with the 8-nitro-thiophanthraquinone, showed a strong depression.

Example 4

Twenty-eight (28) parts of anhydrous aluminum chloride were dissolved in 150 parts of nitrobenzene. Ten (10) parts of 4-nitro-(2-thenoyl)-o-benzoic acid, melting range 189°–190° C., were added, the temperature was raised to 125° C. in 4 hours, and kept at from 125° to 130° C. for 18 hours. The reaction mass was then poured into hydrochloric acid and the nitrobenzene was removed with steam. The residue was filtered, washed, dried and slurried in 1100 parts of chlorobenzene at about 25° C. The insoluble material was removed by filtration and the clear solution was passed through a column containing alumina which had been activated by heating at from 325° to 350° C. Most of the impurities were retained on the alumina while the solution of the nitro-thiophanthraquinone passed slowly through the column. This filtrate was evaporated to dryness and 3.5 parts of crude nitro-thiophanthraquinone, melting from 225° to 230° C., were obtained. It was crystallized several times from about 18 parts of chlorobenzene per part of crude product, and was then isolated in pure form, melting at 232°–233° C. The final product of this example is a mixture of 6- and 7-nitro-thiophanthraquinones.

*Example 5*

3.5 parts of 4-nitro-(2-thenoyl)-o-benzoic acid, melting range 189°–190° C., and 1.5 parts of boric acid were dissolved in 36 parts of 95% sulfuric acid. The solution was heated at from 125° to 135° C. for about 30 minutes and then poured on ice. The precipitate was filtered, washed, slurried in warm dilute caustic, filtered, washed again and dried. 1.5 parts of crude nitro-thiophanthraquinone, melting at from 228° to 232° C., was obtained. It was identical with the mixture of 6- and 7-nitro-thiophanthraquinones obtained by the method described in the preceding example.

The processes as described in the above examples may of course be varied in ways obvious to those skilled in the art. While sulfuric acid or aluminum chloride in nitrobenzene are preferably employed in the ring closure of the nitro-(2-thenoyl)-o-benzoic acids, other condensing agents may be employed, such as phosphorus pentoxide itself, or in a solvent, or the ring closure may be carried out by fusion with aluminum chloride and sodium chloride.

We claim:

1. The mono-nitro-thiophanthraquinones of the formula:

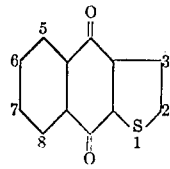

in which the $NO_2$ group is in one of the positions 5, 6, 7, and 8 while the remaining positions are substituted with hydrogen.

2. 7-nitro-thiophanthraquinone.
3. 6-nitro-thiophanthraquinone.
4. 8-nitro-thiophanthraquinone.

HENRY R. LEE.
VIKTOR WEINMAYR.

REFERENCES CITED

The following references are of record in the file of this patent:

Thomas: "Anhydrous Aluminum Chloride," pages 510, 540. Reinhold Pub. Co., N. Y., 1911.
Steinkopf: Ann. 407, 99, 107, 108 (1914).